March 26, 1963   C. M. KELLY ET AL   3,082,510
METHOD FOR MAKING RADAR TRANSPARENT FLEXIBLE COVERING
Filed April 29, 1960

*INVENTORS.*
CHARLES M. KELLY
BY BERNARD D. RAFFEL

ATTORNEY 3,082,510
METHOD FOR MAKING RADAR TRANSPARENT FLEXIBLE COVERING
Charles M. Kelly, Cuyahoga Falls, and Bernard D. Raffel, Akron, Ohio, assignors to Goodyear Aircraft Corporation, Akron, Ohio, a corporation of Delaware
Filed Apr. 29, 1960, Ser. No. 25,584
3 Claims. (Cl. 29—155.5)

This invention relates to radomes and the like, and, more particularly, is concerned with improvements thereto in the form of coatings which will reflect infra-red waves but allow the passage of high frequency electromagnetic waves within the radar bands.

The general object of the invention is the provision of a relatively simple, inexpensive, easily applied coating or covering for radomes, aircraft, blimps, balloons, space vehicles and the like which are transparent to radar waves but highly reflective of lower frequency waves in the infra-red range.

Another object of the invention is to provide a radome or the like which is kept cool by reflecting the sun's rays but which will freely pass radar waves.

The foregoing objects of the invention, and other objects which will become apparent as the description proceeds are achieved by the combination in a radome of a dome-like supporting structure which is transparent to both high frequency electro-magnetic waves within the radar bands and lower frequency infra-red waves, a thin covering of polyester film for the supporting structure within the range of from about 1 mil to about 10 mils thick, adhesive means securing the film to the structure, and a coating of vaporized aluminum on the outer surface of the film, said coating being broken into a plurality of substantially electrically disconnected random pattern particles allowing the passage of high frequency waves within the radar bands but reflecting the lower frequency infra-red waves.

For a better understanding of the invention reference should be had to the accompanying drawings wherein.

Figure 1:
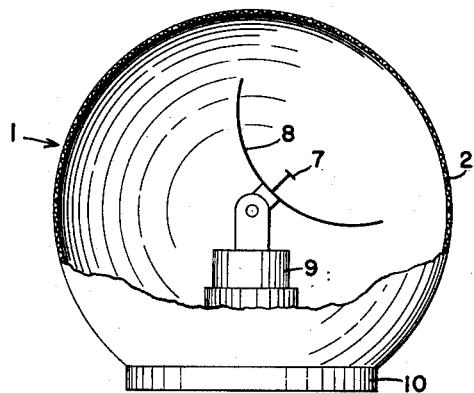
FIG. 1 is a side elevation, partly broken away, of a radar and radome structure to which the invention is applied.

In the drawings, the numeral 1 indicates generally a radar having a radome 2, an antenna 7, a reflector 8 and suitable support and driving mechanism 9 all mounted on a base 10.

Figure 2:
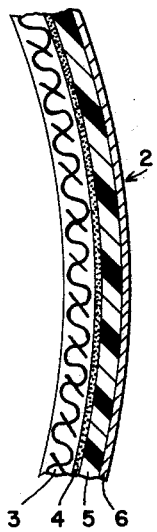
FIG. 2 is an enlarged cross-sectional view of the wall of the radome of FIG. 1.

FIG. 2 illustrates in greater detail the cross-sectional appearance of radome 2 as including a supporting structure 3, an adhesive layer 4 securing a covering of plastic film 5 to the supporting structure, and with an outside coating of relatively thin metal 6 on the film 5.

The supporting structure 3 may take a variety of forms as long as it is transparent to high frequency, electromagnetic waves in the radar band range and substantially transparent to infra-red waves. A typical supporting structure is rubberized or plastic treated fabric which may be gastight and which is inflated internally.

The plastic film 5 is any strong, chemically stable material not becoming too soft or too brittle from a wide range of temperatures and likewise transparent to radar and infra-red waves. A typical suitable material is a polyester film sold by E. I. du Pont de Nemours and Company under the trademark "Mylar." This has a thickness of from about 1 to about 10 mils, good stability within temperature ranges of −60° C. to 150° C., and a tensile strength of 20,000 p.s.i.

The relatively thin coating of metal 6 is selected from the group including aluminum, nickel, gold, silver, platinum, stainless steel, tin, or alloys thereof which provide a bright reflective surface. The metal coating may be deposited on the film 5 in a plurality of ways, but one convenient manner is to use a vaporization technic to give a very thin mirror-like coating.

When the coating 6 is continuous it becomes substantially non-transparent to both radar and infra-red waves. However, if the coating 6 is broken into a plurality of relatively small substantially electrically disconnected areas then while still non-transparent to infra-red waves the coating becomes transparent to radar waves.

One typical manner of forming the coating 6 into a plurality of electrically separated areas is to simply crumple or crinkle the film 5 with the coating 6 thereon with the result that the coating 6 fractures into the plurality of small random areas 6a best seen in FIG. 5. The film 5 is thereafter applied to support structure 3 with suitable adhesive 4.

Figure 3:
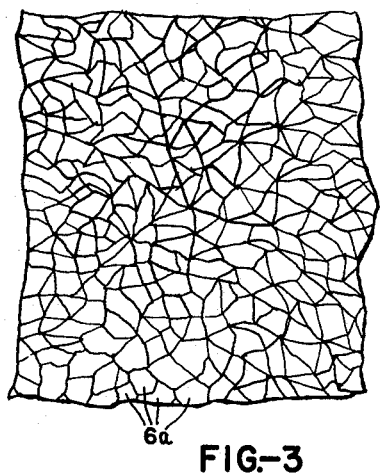
FIG. 3 is a plan view of the electrically interrupted metal coating of FIG. 2.

In actual tests on a structure like that shown in FIG. 2 and wherein the coating 6 appears as in FIG. 3 tests made in the radar range of from about 225 to 33,000 megacycles showed transmissivity of over 99%. Transmissivity in the infra-red range of from 500,000 to 400,000,000 megacycles remained close to 1 or 2%. Transmissivity of the structure of FIG. 2 with the coating 6 continuous and unbroken and in the radar range was less than 1%.

Use of the structure of the invention on blimps, balloons, radomes, and the like allows radar and radio transmission and reception, but keeps out the heat of infra-red waves which are objectionable from the standpoint of operator comfort, gas temperature uniformity, or the like.

While a certain representative embodiment and details have been shown for the purpose of illustrating the invention, it will be apparent to those skilled in this art that various changes and modifications may be made therein without departing from the spirit or scope of the invention.

What is claimed is:

1. A method of making a flexible radome covering, or the like transparent to the passage of radar waves, but reflecting infra-red waves, comprising the steps of providing a flexible but inextensible supporting structure that is transparent to both radar waves and infra-red waves, applying a continuous thin metallic coating to a plastic film less than 10 mils thick, crumpling said film with its metallic coating to fracture the metallic coating into a plurality of small substantially electrically disconnected random areas of different size and shape, smoothing the crumpled film, and bonding the uncoated side of the film with an adhesive to the supporting structure to provide an assembly which allows radar waves to pass but which reflects infra-red rays.

2. A method for making a flexible fabric envelope for radomes or the like which includes the steps of applying a continuous thin metal coating to a thin flexible plastic film, crumpling the film to break the metal coating into a plurality of random sized and shaped areas substantially all of which remain adhered to the film, smoothing the film, and securing the side of the film opposite the coating to a flexible fabric.

3. A method of making a flexible radome covering, or the like, transparent to the passage of radar waves, but reflecting infra-red waves, comprising the steps of providing a flexible but inextensible supporting structure that is transparent to both radar waves and infra-red waves, applying a continuous thin metallic coating to the supporting structure, crumpling the structure with its metallic coating to fracture the metallic coating into a plurality of small substantially electrically disconnected random areas of different size and shape, and smoothing the crumpled structure to provide an assembly which allows radar waves to pass but which reflects infra-red rays.

References Cited in the file of this patent
UNITED STATES PATENTS

| | | |
|---|---|---|
| 2,752,594 | Link | June 26, 1956 |
| 2,875,087 | Crandon | Feb. 24, 1959 |
| 3,025,515 | Fairbanks | Mar. 13, 1962 |